United States Patent [19]

Hlinsky

[11] 4,094,352
[45] June 13, 1978

[54] FASTENERS HAVING TOOTHED BEARING SURFACES

[75] Inventor: Emil J. Hlinsky, Oak Brook, Ill.

[73] Assignee: MacLean-Fogg Lock Nut Co., Mundelein, Ill.

[21] Appl. No.: 734,680

[22] Filed: Oct. 21, 1976

Related U.S. Application Data

[63] Continuation of Ser. No. 589,529, Jun. 23, 1975, abandoned.

[51] Int. Cl.² .................................... F16B 39/28
[52] U.S. Cl. .................................... 151/37
[58] Field of Search .............. 151/35, 37, 39, 40; 10/86 A, 86 B

[56] References Cited

U.S. PATENT DOCUMENTS

| 333,155 | 12/1885 | Procter | 151/39 |
|---|---|---|---|
| 333,548 | 1/1886 | Procter | 151/39 |
| 470,520 | 3/1892 | Timmis | 151/39 |
| 752,628 | 2/1904 | Miner | 151/37 |
| 1,269,386 | 6/1918 | Carlson | 151/39 |
| 2,147,209 | 2/1939 | Olson | 151/37 |
| 2,147,211 | 2/1939 | Olson | 151/37 |
| 2,380,994 | 8/1945 | Pummill | 151/37 X |
| 2,833,326 | 5/1958 | Knohl | 151/37 |
| 2,959,204 | 11/1960 | Rigot | 151/37 |
| 3,078,899 | 2/1963 | MacLean et al. | 151/37 |
| 3,389,734 | 6/1968 | Gutshall | 151/37 |
| 3,605,845 | 9/1971 | Junker | 151/37 |
| 3,752,203 | 8/1973 | Hill | 151/37 |
| 3,825,051 | 7/1974 | Sigmond | 151/37 |

FOREIGN PATENT DOCUMENTS

| 560,055 | 3/1957 | Italy | 151/35 |
|---|---|---|---|
| 109,074 | 11/1943 | Sweden | 151/37 |
| 711,075 | 6/1954 | United Kingdom | 151/35 |
| 1,394,027 | 5/1975 | United Kingdom. | |

Primary Examiner—Roy D. Frazier
Assistant Examiner—Thomas J. Holko
Attorney, Agent, or Firm—Mason, Kolehmainen, Rathburn & Wyss

[57] ABSTRACT

A self-locking fastener for a threaded joint having an end portion with a plurality of teeth in an annular array arranged to indent a coacting surface of a workpiece, to resist loosening. The teeth have individual top bearing surfaces which comprise discontinuous sections of the end surface of the fastener body, the sections being flanked in opposite circumferential directions respectively by abruptly and gradually sloping side surfaces, enabling the fasteners to be turned in a tightening direction and resisting turning in a loosening direction. The top bearing surfaces spread the clamp load and limit indentation of the teeth into the coacting surface to an extent determined by the combined areas of the top bearing surfaces engaged with the coacting surface.

18 Claims, 8 Drawing Figures

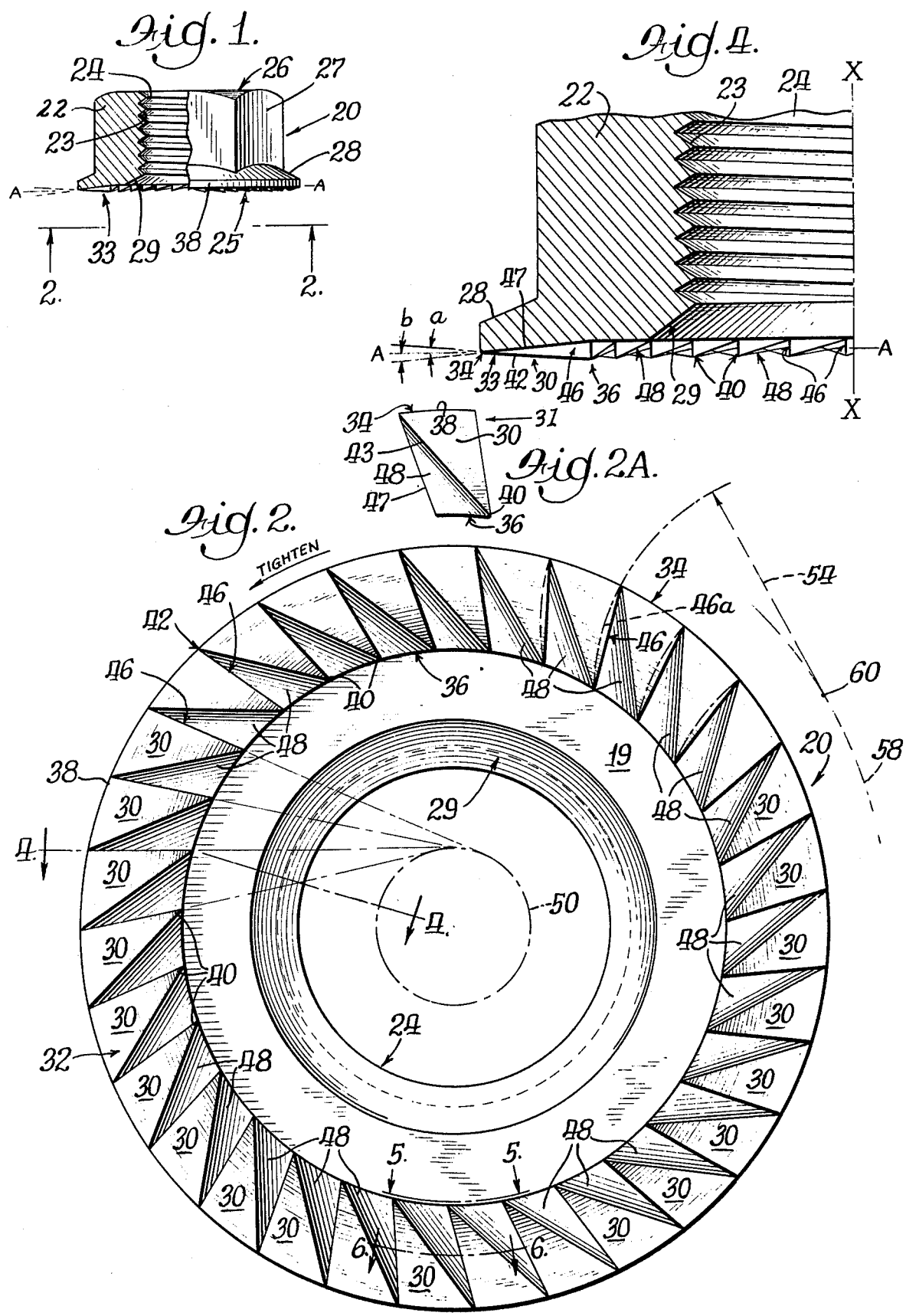

FASTENERS HAVING TOOTHED BEARING SURFACES

This application is a continuation of application Ser. No. 589,529 filed June 23, 1975 now abandoned.

BACKGROUND OF THE INVENTION

This invention relates to fasteners such as nuts, bolts, screws, washers and the like, in the field of self-locking threaded fasteners provided with teeth to resist loosening after being brought into pressure engagement with a coacting surface on a workpiece by rotating the fastener or, in the case of a washer, an element bearing against it, in a tightening direction.

Conventional toothed self-locking fasteners derive their locking action from teeth formed integrally in one or both ends. The teeth are generally saw-tooth in cross sectional shape and may extend completely across the bearing surface with only the teeth edges having more or less line contacts with the coacting surface of the workpiece and pressing progressively deeper into that surface as the fastener is tightened. These teeth edges have abruptly sloping side surfaces in the direction of rotation for loosening, and gradually sloping surfaces on the other side. This enables tightening with reasonable torques and prevents loosening. Such arrangements of saw-tooth-shaped teeth are shown in U.S. MacLean et al Pat. No. 3,078,899, Pummill U.S. Pat. No. 2,380,994, and Hagist U.S. Pat. No. 1,833,462. Attempts to control the depth of penetration of these conventional saw-tooth cross-sectioned teeth have been made by providing a continuous annular bearing ring either inside or outside the teeth. An example is shown in Junker U.S. Pat. No. 3,605,845.

Such annular bearing rings are recessed in an axial direction somewhat behind the crests of the saw-tooth-shaped teeth with the idea that when the teeth are indented a predetermined amount into the coacting surface, further indentation or penetration will be prevented by engagement with the continuous annular bearing. In practice, however, they do not work that way. The continuous annular bearing ring is either recessed too much, or not enough, with respect to the tips of the saw-tooth-shaped teeth, and considering the variations in clamping force in the bolt by manually applied torques, the teeth either do not indent sufficiently to bring the bearing ring in contact with the coacting surface, or the bearing ring engages before the proper clamping force is applied. In either case, the threaded joint can work loose.

To keep such fasteners from jarring loose under vibrating services, experts in this field have long considered it desirable that the torque required to loosen (sometimes hereinafter called the "off torque") should be at least 100% of the torque required to tighten (hereinafter sometimes called the "on torque"). Some of these conventional fasteners provide an off torque/on torque ratio substantially in excess of 100%. Such very high ratios are sometimes necessary where the design of the fastener provides wide ranges between individual fasteners, to be sure that those at the low end are at least 100%. High ratios are also preferred and specified by some designers who believe they provide greater safety margins.

The torque applied to a threaded joint is a convenient, though approximate, indicator of the bolt stress which determines the clamp load. It is most important that a desired clamp load, once applied, be maintained. One factor heretofore overlooked or inadequately dealt with in the concern for providing a high off torque/on torque ratio to keep the nut or bolt from unscrewing, is that clamp load can be lost without any back rotation of either part. Applicant has found that when a threaded joint, with a conventional toothed fastener, is subjected to vibration, or cyclic loading, the stress concentration under the tooth crests will progressively indent the relatively softer coacting surface of the workpiece and relax the bolt tension. If this continues long enough, tension will drop to the point where the bolt or nut, or both, will back off and the joint will come apart.

Thus, it is just as important, in keeping a threaded joint tight, to prevent excessive stress concentration under the teeth and thereby avoid uncontrolled indentation, as it is to provide a suitable relationship between the off torque and the on torque.

SUMMARY OF THE INVENTION

It is a primary object of the present invention to provide an improved, toothed, self-locking fastener for a threaded joint in which stress concentration in the coacting surface of the workpiece, under the teeth, is limited, to thereby prevent loosening of the joint due to excessive indentation of the teeth.

An important feature of the invention is that each individual tooth has a bearing surface to limit its own indentation into the coacting surface of the workpiece to prevent loosening of the bolted joint, either due to insufficient clamp load where a continuous bearing ring is insufficiently recessed behind the teeth tips to prevent proper indentation of the coacting surface, or due to excessive clamp load where such a continuous bearing ring is excessively recessed behind the tooth tips causing the bearing stress at the tips to excess the yield stress of one or both of the coacting materials.

Another important feature is that the bearing surfaces associated with the individual teeth follow a generally conical profile, concentric with the central axis of the fastener, whereby the portion of those bearing surfaces engaging the coacting surface of the workpiece increases as the tightening torque is increased, to automatically limit the stress concentration and indentation along the teeth crests during tightening.

BRIEF DESCRIPTION OF THE DRAWINGS

FIG. 1 is a side elevational view of a preferred embodiment of the present invention as applied to a flanged nut, a portion of the nut being broken away to illustrate details;

FIG. 2 is an enlarged bottom view of FIG. 1 as seen in the direction of the arrows 2—2;

FIG. 2A is a fragmentary view of FIG. 2 showing a single one of the improved tooth elements removed from FIG. 2;

FIGS. 4, 5 and 6 are cross-sectional views of FIG. 2 taken along lines 4—4, 5—5, and 6—6, respectively.

Like parts are referred to by like reference characters throughout the figures of the drawings.

DETAILED DESCRIPTION OF THE SPECIFIC EMBODIMENTS

Figure 3:
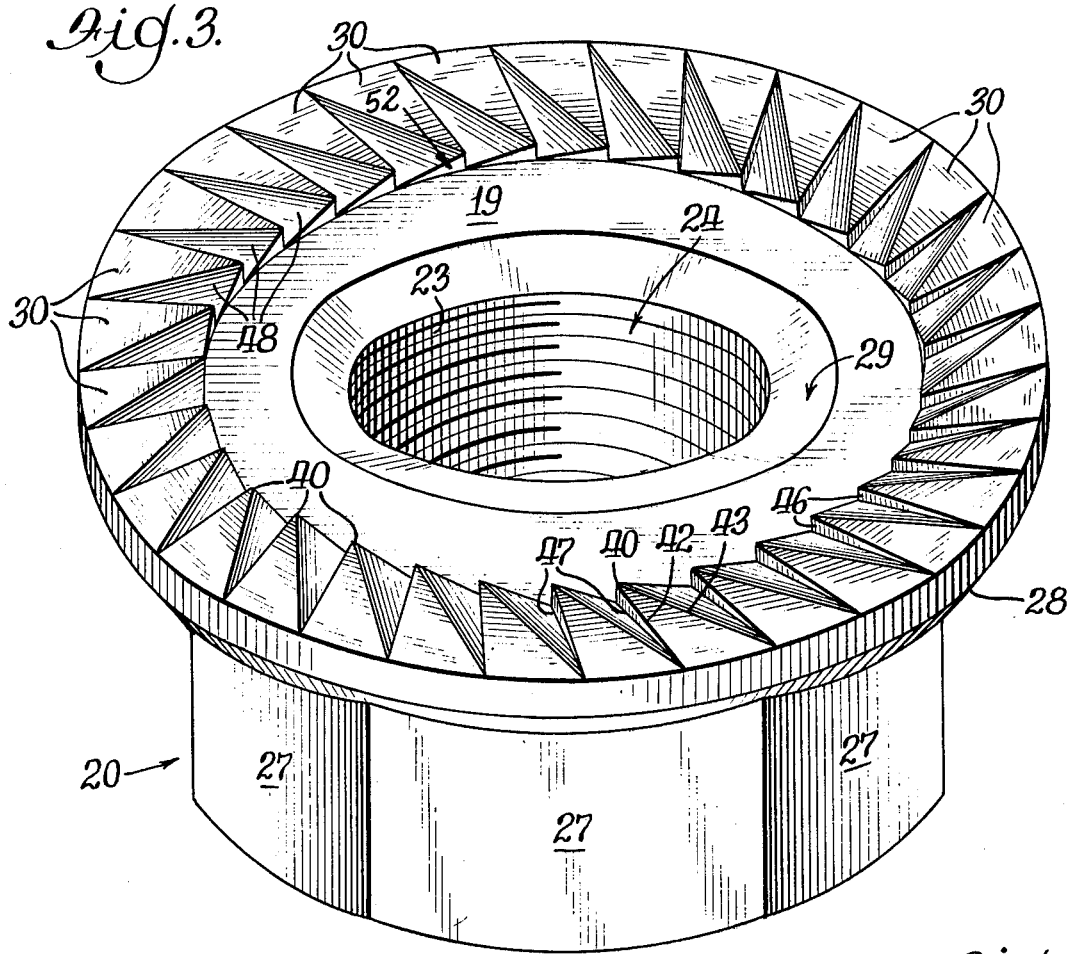
FIG. 3 is a perspective view of FIG. 2.
Figure 5:
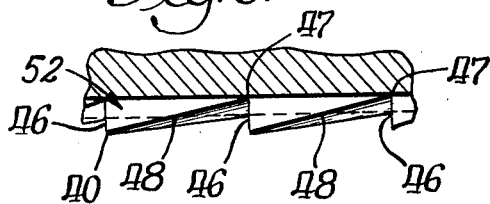
Figure 6:
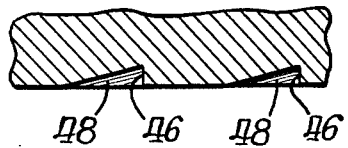

Although the invention is illustrated applied to a specific form of flanged nut, it will be appreciated that it may be applied widely to other forms of nuts, bolts, washers, screws and the like in a threaded joint. In considering fasteners of the type disclosed, it may be understood that the toothed surfaces of the fasteners are intended to be harder than the coacting surfaces of the workpieces (not shown) against which they have pressure contact.

The flanged nut fastener 20 has a body portion 22 which is axially bored and threaded to provide threads 23 encompassing a central opening 24 extending along a central axis X—X between end surfaces 25 and 26 of the body portion. Flat side surfaces 27 are provided in opposed pairs on the outside of the body portion for receiving a torque-applying tool, such as a wrench, for tightening and loosening the fastener. Adjacent the end surface 25, a flange 28 projects outwardly in a radial direction beyond the flat surfaces 27 and their corners of intersection; so that the end surface 25 is larger across than the end surface 26 and provides a bearing surface of larger area than that of the conventional type of square or hexagonal nut. In the form disclosed, the periphery of the flange 28 is substantially circular.

As is customary in mass production of nuts of this type, and to facilitate its application, a circular bevelled surface 29 is provided between the counterbore 19 in the end bearing surface 25 and the threads 23 in the opening 24.

Teeth, individually designated 31, which will be more fully described, are provided on the end bearing surface 25 in an annular array just externally of the counterbore 19.

The teeth 31 project axially of the fastener, that is, in the direction of the central axis X—X. They extend in an annular array, best shown in FIG. 2, having outer and inner circularly extending peripheries 34 and 36. The teeth 31 have individual top bearing surfaces 30 comprising discontinuous sections of a frusto-conical surface generally designated 33 which is disposed at an angle "$a$" with respect to a plane A—A normal to the central axis X—X. For best results, the angle "$a$" should be between 3° and 15°.

Each tooth 31 is flanked in opposite circumferential directions by an abruptly sloping side surface 46 on one side, and a gradually sloping side surface 48 on the other side. In the embodiment shown, each top bearing surface 30 is generally triangular in shape as seen in FIG. 2 and 2A, having a base 38 along the outer periphery 34, a side or margin 42 extending along the intersection of the top bearing surface 30 and the abruptly sloping side surface 46, and a side or margin 43 extending along the intersection of the top bearing surface 30 and the gradually sloping side surface 48. The two sides 42 and 43 meet in an apex 40 at the inner periphery 36.

The side margins 42 and 43 of the individual triangular top bearing surfaces 30 are disposed non-radially with respect to the central axis X—X. Side 42 (and hence the abruptly sloping side surface 46) extend tangent to a circle 50 concentric with the central axis. The sides 43, in the embodiment of FIG. 2, connect the apexes 40 with the root 47 at the base of the abruptly sloping side surface 46. As shown in FIGS. 3 and 4, the height of the abruptly sloping side surface 46, in a direction parallel to the central axis X—X, increases from the outer periphery 34 to the inner periphery 36 where it maximizes at the apex 40.

As stated, each tooth 31 is characterized by an abruptly sloping side surface 46 along side margin 42 (the tooth crest) which is in the direction of rotation for loosening the fastener. Each abruptly sloping side surface 46 (and side margin 42) is illustrated on a straight line tangent to the circle 50. Alternatively, each may be formed on a curved line shown by the arc 46a drawn on a radius 54 from a point 60 on a circle 58, all as described in detail in U.S. Pat. No. 3,078,899 assigned to the assignee of this invention. Further, each tooth has a gradually sloping side surface 48 along side margin 44 in the direction of rotation for tightening the fastener. An inner surface 52 of each tooth follows the inner periphery 36 and coincides with the gradually sloping surface 48. The apex 40 in each case is offset from the corresponding base 38, circumferentially, toward the direction of rotation for loosening the fastener. This enables cuttings or chips dislodged by the abruptly sloping side surfaces 46 to be displaced outwardly as the fastener is loosened. Alternatively, the teeth may be oblique in the other direction, enabling chips to be displaced inwardly into the counterbore 19.

Thus, it will be obvious that the teeth 31 are in an annular array, separated by an annular array of recesses coincident with the gradually sloping surfaces 48. It will further be obvious that the apexes 40, and all other corresponding portions of the top bearing surfaces 30 outwardly of the apexes, are equally spaced along the central axis X—X for coincident engagement with the coacting surface of a workpiece when tightened onto it.

As shown in FIGS. 2, 3, 5 and 6, each of the abruptly sloping side surfaces 46 comprises in effect the cutting or locking surface of the tooth. The "crest" of the tooth is along the margin 42. The "root" of the tooth is along the corner 47. As shown in FIG. 4, the root 47 is progressively recessed into the body, at an angle "$b$" with respect to the normal plane A—A.

In operation, the fastener will be tightened in a counterclockwise direction (FIG. 2), and loosened in the opposite direction. Because the top bearing surfaces 30 of the teeth lie in an imaginary frusto-conical surface with the inner portion adjacent the inner periphery 36 projecting axially ahead of the outer periphery 34, the apexes 40 will first come into contact with a workpiece as the fastener is initially tightened. Progressively, as the fastener is further tightened, contact with the surfaces 30 will spread toward the outer periphery 34. The recesses adjacent the abruptly sloping side surfaces 46 enable cold flow of the relatively softer workpiece material into the recesses as the clamping load indents the teeth into the coacting surface thereof. When tightening is stopped, a slight ridge of the workpiece material bulges into each recess behind each surface 46 to lock it in place.

One of the important advantages of this invention is that the top bearing surfaces 30 of individual teeth come into pressure engagement with the coacting surface of the workpiece (not shown), to limit stress concentration and indentation along the teeth crests 42. Further, as the tightening torque is increased, the portion of the entire area of the bearing surfaces so engaged increases as the pressure contact spreads outward from the apexes 40 at the inner periphery 36 toward the outer periphery 34. The stress concentration in the coacting surface is thus automatically limited, even though the torque increased as the joint is tightened or the bolt stress increases under load, because the bearing engagement spreads outwardly from the relatively narrow apex 40 toward the relatively wide base 38.

Figure 7:
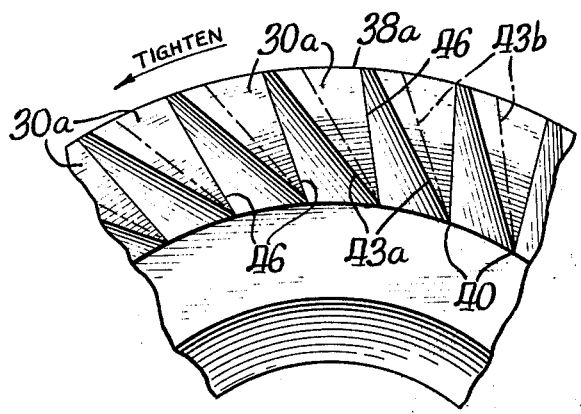
FIG. 7 is a fragmentary view similar to FIG. 2, of another embodiment of the invention.

An important advantage of the present invention is that the degree of indentation of the fastener into the workpiece is readily controlled by varying the total surface area of the top bearing surfaces 30 with respect to the annular area between the outside and inside peripheries 34 and 36. For example, FIG. 7 shows a margin 43a which is comparable to margin 43 shown in the previous embodiment except that the resultant bearing surfaces 30a have a smaller area than the surfaces 30. Thus, the embodiment of FIG. 7 will indent more deeply into a workpiece than the previous embodiment with any given torque. Alternatively, the top bearing surfaces of the teeth may be further reduced in area by moving margins 43a further to the right, for example, to the locations indicated 43b in FIG. 7.

Because the toothed top bearing surfaces 30, or 30a, and the recesses between them, occupy the entire annular area between the circular peripheries 34 and 36, it necessarily follows that enlargement of the area of the recesses decreases the area of the top bearing portions 30 (or 30a) and vice versa. By reducing the area of the top bearing portions 30 (or 30a) the bearing stress concentration against the coacting surface of the workpiece will thereby be increased, and the indentation of the tooth crests 42 and apexes 40 will be increased thereby increasing the off torque/on torque ratio. Conversely, increasing the area of the teeth top bearing surfaces by decreasing the recesses will reduce the off torque/on torque ratio.

It will be understood that the drawing and the description disclose only three specific examples of many possible variations of the invention. Many structural considerations including the number, shape and disposition of the teeth, the slopes and shapes of the teeth surfaces, as well as the manner of engagement of the teeth surfaces with the structure contacted thereby, have important influences in obtaining an optimum off torque/on torque ratio and clamping load for a given application torque.

The embodiments of the invention in which an exclusive property or privilege is claimed are defined as follows:

1. In a fastener for a threaded joint, a body having an end portion symmetrical about a central axis with a plurality of teeth in an annular array integrally formed in said end portion;
    said teeth having individual top bearing surfaces comprising discontinuous sections of said end surface, said individual top bearing surfaces being flanked in opposite circumferential directions respectively by an abrupt side surface and a gradually sloping side surface;
    whereby said top bearing surfaces limit the indentation of said teeth into the coacting surface of a workpiece in accordance with the combined areas of said top bearing surfaces;
    said individual top bearing surfaces each having generally the shape of a triangle with a base and an apex respectively at outer and inner margins of said annular array; and
    the height of each abrupt side surface as measured parallel to said central axis progressively increasing from the base to the apex.

2. In a fastener for a threaded joint, the combination of claim 1 in which said teeth have crests extending along intersections of said top bearing surfaces and said abrupt side surfaces, said crests being non-radial with respect to said central axis.

3. In a fastener for a threaded joint, the combination of claim 2 in which said crests extend across said annular array in directions tangent to a circle concentric with said axis.

4. In a fastener for a threaded joint, the combination of claim 1 in which said top bearing surfaces comprise discontinuous sections of a cone.

5. In a fastener for a threaded joint, the combination of claim 4 in which said cone has an angle of 3° to 15° relative to a plane normal to said central axis.

6. In a fastener for a threaded joint, the combination of claim 1 in which the sides of said triangle define the margins of said individual top bearing surfaces along said abrupt and gradually sloping side surfaces, and both of said sides of said triangle are non-radial with respect to said central axis.

7. In a fastener for a threaded joint, the combination of claim 1 in which said sides of each said triangle are respectively tangent to different circles concentric with said axis.

8. In a fastener for a threaded joint, the combination of claim 1 in which the apex of each tooth is offset from the corresponding base, circumferentially, toward the direction of rotation for loosening the fastener.

9. In a threaded fastener, a body having an annularly extending end portion concentric with a central axis with outer and inner circularly extending peripheries defining radially outward and inward limits of bearing engagement with a coacting surface of a workpiece;
    an annular array of obliquely inwardly extending triangular teeth formed in said bearing surface comprising generally triangular portions of said bearing surface each having a base and an apex located respectively at said outer and inner peripheries, and each having side margins extending diagonally across said bearing surface between the respective ends of said base and said apex;
    said side margins of the teeth in the direction of rotation for loosening the fastener comprising crests of the teeth and extending tangent to a circle concentric with said central axis;
    said teeth having abruptly sloping side surfaces along said side margins in the direction of rotation for loosening the fastener, said abruptly sloping side surfaces increasing progressively in height from said base to said apex; and
    said teeth having gradually sloping side surfaces along said side margins in the direction of rotation for tightening the fastener, said gradually sloping side surfaces extending to the root edges of said abruptly sloping side surfaces on the adjacent teeth and defining recesses between adjacent teeth.

10. In a threaded fastener, the combination of claim 9 in which the crests of the teeth extend in directions tangent to a circle concentric with the central axis.

11. In a threaded fastener, the combination of claim 9 in which said abruptly sloping side surfaces and said crests are obliquely canted across said annularly extending end portion to displace chips during rotation in a direction to loosen said fastener.

12. A locking fastener for a threaded joint including a workpiece, said fastener comprising:
    a body having a workpiece engaging end;
    an annular array of teeth formed integrally in said end, each tooth having an individual top bearing surface flanked in opposite circumferential directions by side surfaces defining recesses between teeth;
    said top bearing surfaces lying in a cone symmetrical with the central axis;

each bearing surface having generally the shape of a triangle with a base and an apex offset radially from one another with respect to said central axis, and said apex being spaced from the fastener axis by a radial distance larger than the radial distance between the base and the apex;

the depth of said recesses as measured parallel to the central axis progressively increasing from the base to the apex;

the region of said bearing surface adjacent said apex projecting further from the fastener body than said base.

13. A locking fastener as claimed in claim 12, said apexes being closer to said central axis than said bases.

14. A locking fastener as claimed in claim 12, said apexes and said bases lying in concentric circles surrounding said central axis.

15. A tooth configuration for a locking fastener having an annular array of similar ones of such teeth defined in a workpiece engaging end of the fastener, said annular array surrounding the fastener axis; said tooth configuration comprising:

a top bearing surface bounded by a generally triangular periphery including a base and an apex;

a pair of side surfaces defining the sides of the tooth and having upper edges coincident with the two sides of said triangular periphery and having lower edges defining the tooth root;

the distance between the tooth root and the bearing surface as measured parallel to the fastener axis progressively increasing from the base to the apex;

said base and apex being offset from one another in the radial direction from the fastener axis, and said apex being spaced from the fastener axis by a radial distance larger than the radial distance between the base and the apex;

the region of said bearing surface adjacent said apex projecting from the fastener body for initial contact with the workpiece; and said bearing surface being inclined relative to said fastener axis for gradually increasing area contact of said bearing surface with said workpiece as the fastener end engages the workpiece.

16. The tooth configuration of claim 15 wherein said bearing surface is coplanar with a cone symmetric with the fastener axis.

17. The tooth configuration of claim 15 wherein one of said side surfaces in inclined relative to said fastener axis.

18. The tooth configuration of claim 17 wherein the other said side surface lies in a plane parallel with said fastener axis.

* * * * *